United States Patent
Lim et al.

(10) Patent No.: US 10,013,041 B2
(45) Date of Patent: Jul. 3, 2018

(54) DIRECTED WAKEUP INTO A SECURED SYSTEM ENVIRONMENT

(75) Inventors: Thiam Ern Lim, Bayan Lepas (MY); Wan Chin Teh, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,324

(22) PCT Filed: Feb. 20, 2012

(86) PCT No.: PCT/MY2012/000028
§ 371 (c)(1),
(2), (4) Date: Oct. 20, 2014

(87) PCT Pub. No.: WO2013/125937
PCT Pub. Date: Aug. 29, 2013

(65) Prior Publication Data
US 2015/0039919 A1    Feb. 5, 2015

(51) Int. Cl.
| | |
|---|---|
| *G06F 1/26* | (2006.01) |
| *G06F 1/32* | (2006.01) |
| *G06F 21/30* | (2013.01) |
| *G06F 21/00* | (2013.01) |
| *G06F 21/74* | (2013.01) |
| *G06F 21/81* | (2013.01) |

(52) U.S. Cl.
CPC ............... *G06F 1/32* (2013.01); *G06F 21/00* (2013.01); *G06F 21/305* (2013.01); *G06F 21/74* (2013.01); *G06F 21/81* (2013.01)

(58) Field of Classification Search
CPC ........... G06F 1/32; G06F 21/00; G06F 21/305
USPC ................................................ 713/300, 320
See application file for complete search history.

(56) References Cited

U.S. PATENT DOCUMENTS

| | | | |
|---|---|---|---|
| 5,878,264 A * | 3/1999 | Ebrahim ............... | G06F 1/3203 713/323 |
| 7,822,960 B2 | 10/2010 | Zimmer et al. | |
| 2004/0003273 A1 | 1/2004 | Grawrock et al. | |

(Continued)

FOREIGN PATENT DOCUMENTS

| | | |
|---|---|---|
| CN | 1662869 A | 8/2005 |
| WO | 2013125937 A1 | 8/2013 |

OTHER PUBLICATIONS

International Search Report and Written Opinion received for International Application No. PCT/MY2012/000028, dated Sep. 28, 2012, 9 pages.

(Continued)

*Primary Examiner* — Robert Cassity
(74) *Attorney, Agent, or Firm* — Nicholson De Vos Webster & Elliott LLP (57) ABSTRACT

Embodiments of processors, methods, and systems for directed wakeup into a secured system environment are disclosed. In one embodiment, a processor includes a decode unit, a control unit, and a messaging unit. The decode unit is to receive a secured system environment wakeup instruction. The control unit is to cause wake-inhibit indicator to be set for each of a plurality of responding logical processor to be kept in a sleep state. The messaging unit is to send a wakeup message to the plurality of responding logical processors, wherein the wakeup message is to be ignored by each of the plurality of responding logical processors for which the wake-inhibit indicator is set.

20 Claims, 4 Drawing Sheets

(56) References Cited

U.S. PATENT DOCUMENTS

| | | | |
|---|---|---|---|
| 2005/0055594 A1* | 3/2005 | Doering | G06F 1/12 |
| | | | 713/375 |
| 2006/0130130 A1* | 6/2006 | Kablotsky | G06F 21/74 |
| | | | 726/9 |
| 2006/0224878 A1 | 10/2006 | Datta et al. | |
| 2007/0277223 A1* | 11/2007 | Datta | G06F 21/53 |
| | | | 726/2 |
| 2008/0082845 A1 | 4/2008 | Morisawa | |
| 2010/0275046 A1 | 10/2010 | Shimazaki et al. | |
| 2011/0161694 A1 | 6/2011 | Fujiwara | |
| 2014/0298066 A1* | 10/2014 | Zhang | H04L 12/12 |
| | | | 713/323 |

OTHER PUBLICATIONS

Office Action Received for Chinese Patent Application No. 2012800700883 dated Mar. 9, 2016, 10 pages of Office Action and 7 pages of English Translation.

European Search Report received for European Patent Application No. 12869115.1 dated Jul. 13, 2015, 8 pages.

Office Action Received for Chinese Patent Application No. 201280070088.3 dated Aug. 2, 2016, 8 pages of Office Action and 6 pages of English Translation.

Decision on Rejection from foreign counterpart China Patent Application No. 201280070088.3, dated Jun. 12, 2017, 21 pages.

* cited by examiner

Method 400

DIRECTED WAKEUP INTO A SECURED SYSTEM ENVIRONMENT

BACKGROUND

Field

The present disclosure pertains to the field of information processing, and more particularly, to the field of security in information processing systems.

Description of Related Art

Information processing systems, such as those including a processor in the Intel® Core® Processor Family from Intel Corporation, may support operation in a secured system environment. A secured system environment may include a trusted partition and an un-trusted partition. The bare platform hardware of the system and trusted software may be included in the trusted partition, Direct access from the un-trusted partition to the resources of the trusted partition may be prevented to protect any secrets that the system may contain from being discovered or altered. These secrets may include passwords, keys, and private or confidential information generated or stored on the information processing system.

The bare platform hardware of the system may be included in the trusted partition or domain through the execution of a secured system entry protocol. For example, an initiating processor may execute a secured enter ("SENTER") instruction, to which all agents in the system must respond appropriately in order for the protocol to succeed. The responding agents may be prevented from executing any program instructions or process any external transactions during the secured entry process, so that the initiating processor may validate a signed code module as authentic and trusted, execute the signed code module to configure the system to support trusted operations, measure (cryptographically, using a hash extend function) and then initiate the execution of a measured virtual machine monitor ("MVMM"). The MVMM may create one or more virtual machine environments in which to run un-trusted software, such that un-trusted software does not have direct access to system resources.

BRIEF DESCRIPTION OF THE FIGURES

The present invention is illustrated by way of example and not limitation in the accompanying figures.

DETAILED DESCRIPTION

Embodiments of apparatuses, methods, and systems for directed wakeup into a secured system environment are described below. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention. Furthermore, this description may refer to instructions by names that may be used according to one embodiment (e.g., "SENTER"); in other embodiments, these instructions or similar instructions may have different names.

Embodiments of the present invention may be used for power management in a secured system environment. Techniques according to embodiments of the present invention may be used to selectively wakeup processors and other agents after a secured system environment has been entered, so that system power may be reduced.

Figure 1:
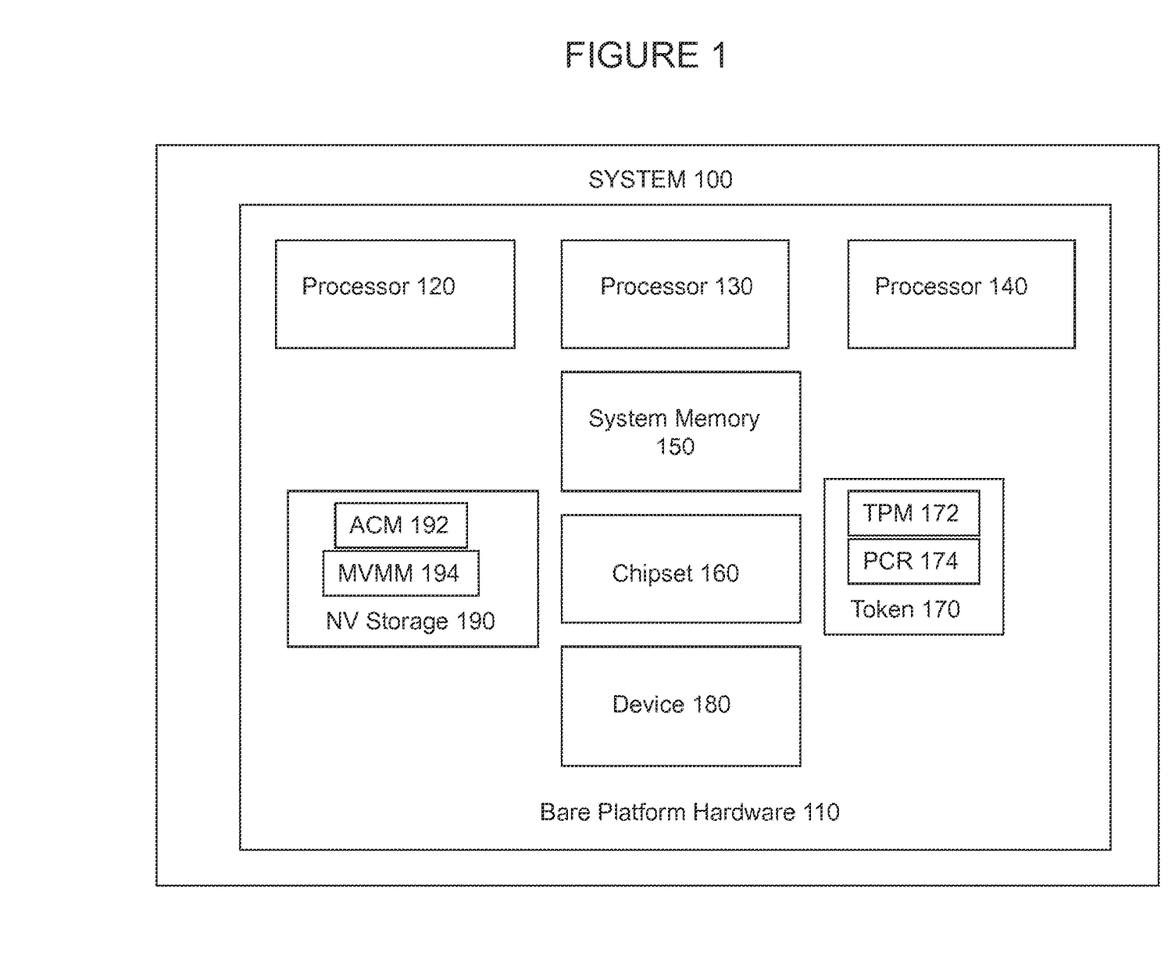
FIG. 1 illustrates an information processing system in which embodiment of the present invention may be present and/or operate.

FIG. 1 illustrates an embodiment of the present invention in information processing system 100. Information processing system 100 may be personal computer, a mainframe computer, a portable computer, a handheld device, a set-top box, a server, or any other computing system. In this embodiment, system 100 includes bare platform hardware 110, which in turn includes processors 120, 130, and 140, system memory 150, chipset 160, token 170, device 180, and non-volatile storage 190.

Each of processors 120, 130, and 140 may represent a component having one or more execution cores, where each execution core may be based on any of a variety of different types of processors, including a general purpose microprocessor, such as a processor in the Intel® Core® Processor Family or other processor family from Intel® Corporation, or another processor from another company, or a special purpose processor or microcontroller, or may be a reconfigurable core (e.g. afield programmable gate array). Although FIG. 1 shows three such processors, system 100 may include any number of processors, each including any number of execution cores and execution threads, in any combination. In some embodiments, any or all of processors 120, 130, or 140 may represent a separate hardware execution thread or "logical processor" running on one or more physical processors.

System memory 150 may be any medium on which information, such as data and/or program code, may be stored, such as dynamic random access memory, or any other type of medium readable by processors 120, 130, and 140, or any combination of such mediums.

Chipset 160 may represent any group of circuits and logic that supports memory operations, input/output ("I/O") operations, configuration, control, internal or external interface, connection, or communications functions (e.g., "glue" logic and bus bridges), and/or any similar functions for processors 120, 130, and 140 and/or system 100. Individual elements of chipset 160 may be grouped together on a single chip, a pair of chips, dispersed among multiple chips, and/or be integrated partially, totally, redundantly, or according to a distributed approach into one or more processors, including any of processors 120, 130, and/or 140.

Token 170 may include trusted platform module ("TPM") 172 and platform configuration register ("PCR") 174. TPM 172 may be a component, including a microcontroller, to securely store keys, passwords, digital certificates, and other information used to establish and maintain security, PCR 174 may include any number of registers and/or other storage locations to store system configuration information. TPM 172 and/or PCR 174 are configured to be accessible only to certain agents and/or under certain conditions. Token 170 and/or either or both of TPM 172 and PCR 174 may be included in chipset 160 or an other component in system 100.

Device 180 may represent any number of any type of IO, peripheral, or other devices, such as a keyboard, mouse, trackball, pointing device, monitor, printer, media card, network interface, information storage device, etc. Device 180 may be embodied in a discrete component, or may be included in an integrated component with any other devices. In one embodiment, device 180 may represent a single function in a multifunctional 10, peripheral, or other device.

Processors 120, 130, and 140, system memory 150, chipset 160, token 170, and device 180 may be coupled to or communicate with each other according to any known approach, such as directly or indirectly through one or more parallel, sequential, pipelined, asynchronous, synchronous, wired, wireless, or other bus or point-to-point connection. System 100 may also include any number of additional devices, agents, components, or connections.

Figure 2:
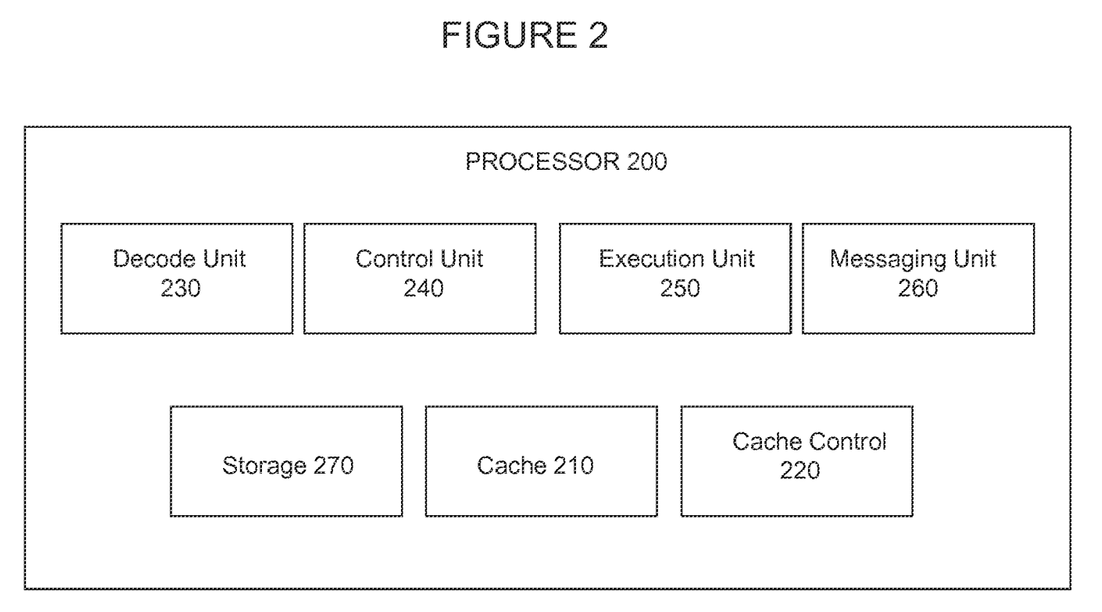
FIG. 2 illustrates a processor in which an embodiment of the present invention may be present and/or operate.

FIG. 2 illustrates processor 200, which may represent any of processors 120, 130, or 140, in FIG. 1, or any other processor according to an embodiment of the present invention.

Processor 200 may include cache 210, which may be static random access memory, or any other form of storage for information, such as data that is copied from system memory 150. Processor 200 (or cache 210) may also include cache control logic 220 to controls whether cache 210 operates in normal mode or in cache-as-random-access-memory ("CRAM") mode. In normal mode, cache 210 satisfies memory requests in response to cache hits, replaces cache lines in response to cache misses, and may invalidate or replace cache lines in response to snoop requests. In CRAM mode, cache 210 operates as random access memory in which requests within the memory range of the cache memory are satisfied by the cache memory and lines of the cache are not replaced or invalidated in response to snoop requests.

Processor 200 may also include instruction unit 230, control unit 240, execution unit 250, messaging unit 260, and storage 270. Storage 270 is to store any information or parameters that may be useful to implement embodiments of the invention, and may include any type of memory accessible by processor 200, such as registers or arrays of read-only or read-writable memory, or any combination of different types of memory. In FIG. 2, storage 270 may represent multiple storage locations that may be physically separated within processor 200, such as a number of general purpose processor registers, a number of model specific registers, and a number of machine state storage locations instruction unit 230 may include any circuitry, logic, or other hardware or structures, such as a decoder, to receive, recognize, decode, or otherwise receive instructions. Control unit 240 may include any circuitry, logic, or other hardware or structures, such as microcode, state machine logic, programmable logic, or any other form of control logic, to generate control signals for, or otherwise control processor 200 in response to instructions received by instruction unit 230 and/or messages received by messaging unit 260.

Execution unit 250 may include any circuitry, logic, or other hardware or structures to execute instructions received by instruction unit 230. Execution unit 250 may operate based on control signals generated by control unit 240. Messaging unit 260 may include any circuitry, logic, or other hardware or structures to generate messages to be sent by processor 200 to other components or agents in system 100, and to receive messages sent to processor 200 by other components or agents in system 100.

In one embodiment of processor 200, instruction unit 210 may be to receive an instruction(a "SENTER" instruction) for processor 200 to begin a process to establish a secured environment in system 100 (a "SEVIER" process). In response to the SENTER instruction, control unit 240 generates control signals to cause messaging unit 260 to generate a "SENTER" bus message (or other type of message in a system wherein processors and other agents communicate by a means other than a bus) that is recognized by the messaging units of other processors and agents as a SENTER bus message. The processor or execution thread executing the SENTER instruction and sending the SENTER bus message is referred to as the "initiating logical processor" ("ILP").

Figure 3:
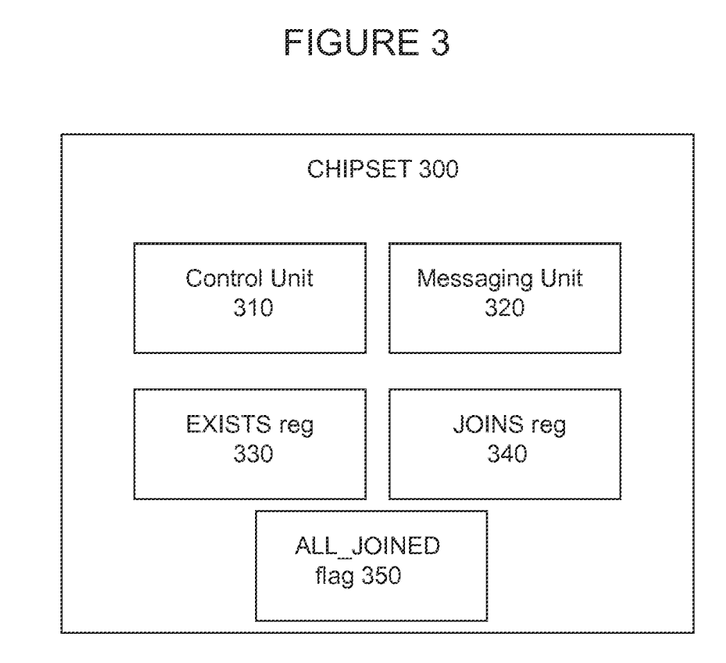
FIG. 3 illustrates a chipset in which an embodiment of the present invention may be present and/or operate.

Each processor, execution thread, or other agent in the system that receives the SENTER. bus message is referred to as a "responding logical processor" ("RLP"). In response to the SENTER bus message, each RIP performs actions to prepare for the establishment of the secured environment and allow the ILP to proceed with launching the secured environment. One of these actions may be for their messaging units to generate an "ACK," bus message to acknowledge the receipt of the SENTER bus message. Another may be to move into a sleep state after acknowledging receipt of the SENTER message. The sleep state may be a mode in which an RLP waits for the ILP to indicate the successful completion of the SENTER process, and does not execute any instructions or make any attempts to access any system resources, FIG. 3 illustrates chipset 300, which may represent chipset 160, or any other chipset or component performing the function of chipset 160 according to an embodiment of the present invention. Chipset 300 may include messaging unit 310, control unit 320, "EXISTS" storage location 330, "JOINS" storage location 340, and "ALL_JOINED" storage location 350.

Messaging unit 310 may include any circuitry, logic, or other hardware or structures to generate messages to be sent by chipset 300 to other components or agents in system 100, and to receive messages sent by other components or agents in system 100. Control unit 320 may include any circuitry, logic, or other hardware or structures, such as microcode, state machine logic, programmable logic, or any other form of control logic, to generate control signals for, or otherwise control chipset 200 in response to messages received by messaging unit 310.

Each of "EXISTS" storage location 330, "JOINS" storage location 340, and "ALL_JOINED" storage location 350 may include a register or any other form of storage for information, and may include storage for any number of bits. In one embodiment, control unit 320 may use EXISTS storage location 330 to keep track of all logical processors and other agents operating in system 100, and JOINS storage location 340 to keep track of all logical processors and other agents that have acknowledged a SENTER bus message. When all processors and other agents in system 100, as reflected in EXISTS storage location 330, have acknowledged the SENTER bus message, as reflected in JOINS storage location 340, then. control unit 320 may set an indicator in "ALL_JOINED" storage location 350 to indicate to the ILP that the launching of a secured environment may proceed. Note that in this description of the SENTER process, as in the rest of this description, many details not required to describe and enable embodiments of the present invention have been omitted, and many variations of the process are possible. For example, where the ILP and RLPs are connected on by a front-side processor bus ("FSB"), FSB transactions may include an identifier of the initiator of each transaction, and chipset 300 may be connected to the FSB to keep track of all FSB processors or other bus agents.

Returning to FIG. 1, non-volatile storage 190 may represent any number of separate non-volatile storage mediums in system 100, such as semiconductor flash memory or magnetic or optical disk, Non-volatile storage 190 may be used to store software components used in embodiments of the present invention. For example, non-volatile storage 190 may store authenticated code module ("ACM") 192 and measured virtual machine monitor ("MVMM") 194.

ACM 192 may be executed by a processor or processors during the SENTER process to perform any number of actions involved in establishing a secured environment. For example, ACM 192 may be used to initialize, configure, and test components within system 100 for their participation in the secured environment. In one embodiment, ACM 192 may be used to test the memory configuration of system 100, as controlled by memory controller functions in any processor, chipset, or other component in system 100, to ensure that access to certain pages or portions of system memory 150 may be limited or controlled such that MVMM 194 and/or other software used to secure system 100 may be protected when stored in system memory 150. In another embodiment, ACM 192 may be used to authenticate MVMM 194 and any other software to be used within the secured environment, and to launch the execution of MVMM 194.

MVMM 194 may be any virtual machine monitor, hypersvisor, or other such software program that is a trusted entity invoked during a SENTER process to control one or more virtual machines to execute other software programs (often called a measured launch environment, or "MLE"), some of which are trusted and some of which are not trusted.

To establish a secured environment in system 100, system software such as an operating system ("OS") or basic input/output system ("BIOS"), running on any of processors 120, 130, 140, or any other processor in system 100 may transfer ACM 192 and MVMM 194 from non-volatile storage 190 to system memory 150, then cause one of these processors (e.g., processor 120) to execute a SENTER instruction. Execution of the SENTER instruction may cause processor 120, as the ILP, to issue a SENTER bus message, poll ALL_JOINED storage location. 350 until all RLPs have acknowledged the SENTER bus message, configure cache 122 to operate in CRAM mode, and load ACM 192 into cache 122. Cache 122 may be configured to operate in CRAM mode so that cache 122 may serve as a private, secure memory in which processor 120 may authenticate ACM 192.

ACM 192 may include a secure initialization ("SINIT") module that may be used to validate various hardware settings and perform other functions as part of establishing a secured system environment. Upon completion, the SNIT module may use an instruction (e.g., an "EXITAC" instruction) to exit the authenticated code execution mode and jump to an entry point for execution of the MVMM.

In one embodiment of processor 200, instruction unit 210 may also be to receive an instruction (a "WAKEUP" instruction) for processor 200 to wakeup the RLPs from that sleep state. This instruction may be used, for example, by the MVMM as part of the completion of the SENTER process. In response to the WAKEUP instruction, control unit 240 generates control signals to cause messaging unit 260 to generate a "WAKEN" bus message (or other type of message in a system wherein processors and other agents communicate by a means other than a bus) that is recognized by the messaging units of other processors and agents as a WAKEUP bus message. Only the ILP may successfully execute the WAKEUP instruction and send a WAKEUP bus message.

Embodiments of the present invention provide for selectively waking one or more RLPs by directing a wakeup message to specific RLPs. Embodiments of the present invention may be used to designate the RLPs to which the wakeup message is directed.

In one embodiment, where the ILP is a processor in the Intel® Pentium® Processor Family, the SENTER and WAKEUP instructions may be leaf functions of a higher level instruction (e.g., GETSEC), and storage 270 may include the processor's EAX, EBX, ECX, and EDX registers. Leaf functions may be identified and further defined by the values in these or other registers or storage locations. For example, software may preload the EAX register with '04h' (where the 'h' refers to hexadecimal notation) or '08h', then use the GETSEC instruction to cause processor 200 to execute the SENTER or the WAKEUP instruction, respectively.

Another leaf function, such as SMCTRL, defined by an EAX value of '07h', may be used to provide secured execution environment control capabilities such as unmasking a system management interrupt. This leaf function may be also be used to switch in and out of directed. wakeup mode. In one embodiment, the SMCTRL instruction executed with a value of '01h' in the EBX register may be used to switch into directed wakeup mode and the SMCTRL instruction executed a with value of '02h' in the EBX register may be used to switch out of directed wakeup mode.

In other words, execution of the WAKEUP instruction when not in directed wakeup mode may cause the wakeup of RLPs, and execution of the WAKEUP instruction when in directed wakeup mode may cause the wakeup of only specific RLPs, In one embodiment, the specific RLPs to be woken may be identified by the values in the ECX and/or EDX registers.

Each RLP may be identified by a unique identification ("ID") value, such as an identification value fur its corresponding local Advanced Programmable Interrupt Controller ("APIC"). Then, the values in the ECX and EDX registers may be used as a mask, such that the result of a logical AND operation on the ID value and the mask value may indicate whether the RLP is to be woken.

For example, assume that an RLP may be a thread within a multi-threaded core within a multi-core processor within a multi-processor package. Then, in one embodiment, an 8-bit value may be used with the highest two bits (bits 7:6) to identify a package, and five middle bits (bits 5:1) to identify a core, and the lowest bit (bit 0) to identify a thread. With a dual-package, dual-core hyper-threading enabled processor, the ID values may be assigned as follows (where 'P' indicates the package number, 'C' indicates the core number, and 'T' indicates the thread number:

For P0C0T0, assign ID value 00h (or 0000_0000b).
For P0C0T1, assign ID value 01h (or 0000_0001b).
For P0C1T0, assign ID value 02h (or 0000_0010b).
For P0C1T1, assign ID value 03h (or 0000_0011b).
For P1C0T0, assign ID value 40h (or 0100_0000b).
For P1C0T1, assign ID value 41h (or 0100_0001b).
For P1C1T0, assign ID value 42h (or 0100_0010b).
For P1C1T1, assign ID value 43h (or 0100_0011b).

Assuming that P0C0T0 is the ILP, the mask value may be used to specify which thread or thread(s) will be kept in the sleep state after executing the WAKEUP instruction. Then, if the result of a logical AND operation on the ID value for a thread and the mask value is zero, the thread is woken.

For instance, if all the RLP threads should be woken after executing the WAKEUP instruction, the value of ECX and EDX should be set to 0h. This may be used as the default configuration. Alternatively, to keep all of the RLP threads in the sleep state after executing the WAKEUP instruction, the value of ECX and EDX should both be set to FFFF_FFFFh. Or, to wake up all threads with a package ID of '0' and core ID of '3', the value of ECX should set to FFFF_FFF8h and the value of EDX should be set to FFFF_FFFFh. Or, to wake up all the threads with a package ID of '1', regardless of the core or thread ID, the value of ECX should be set to FFFF_FF80h and the value of EDX should be set to FFFF_FFFFh.

In other embodiments, the ID and mask values may be of different sizes and/or formats, and may be used to determine which RLPs are to be woken according to any other approach.

For each of the RLPs that are to be kept in the sleep state, the ILP may set an indicator in chipset 160 or elsewhere in system 100. In one embodiment, a PIC_EVENT_INHIBIT [LT_DOORBELL] control bit may be used, where an LT-WAKEUP event is one of the sub-events under the LT-DOORBELL category. If this control bit is set for a specific thread, then the LT-WAKEUP event will be ignored by that RLP. Then, as part of the secured system environment exit process, for example, in response to an SEXIT leaf function of the GETSEC instruction, these control bits would be cleared so that these RLPs could be woken for the EXIT event.

In other embodiments, different logical conventions may be used for any or all bits, indicators, or other values. For example, an indicator may be cleared instead of set to indicate that a WAKEUP event is to be ignored, etc.

Figure 4:
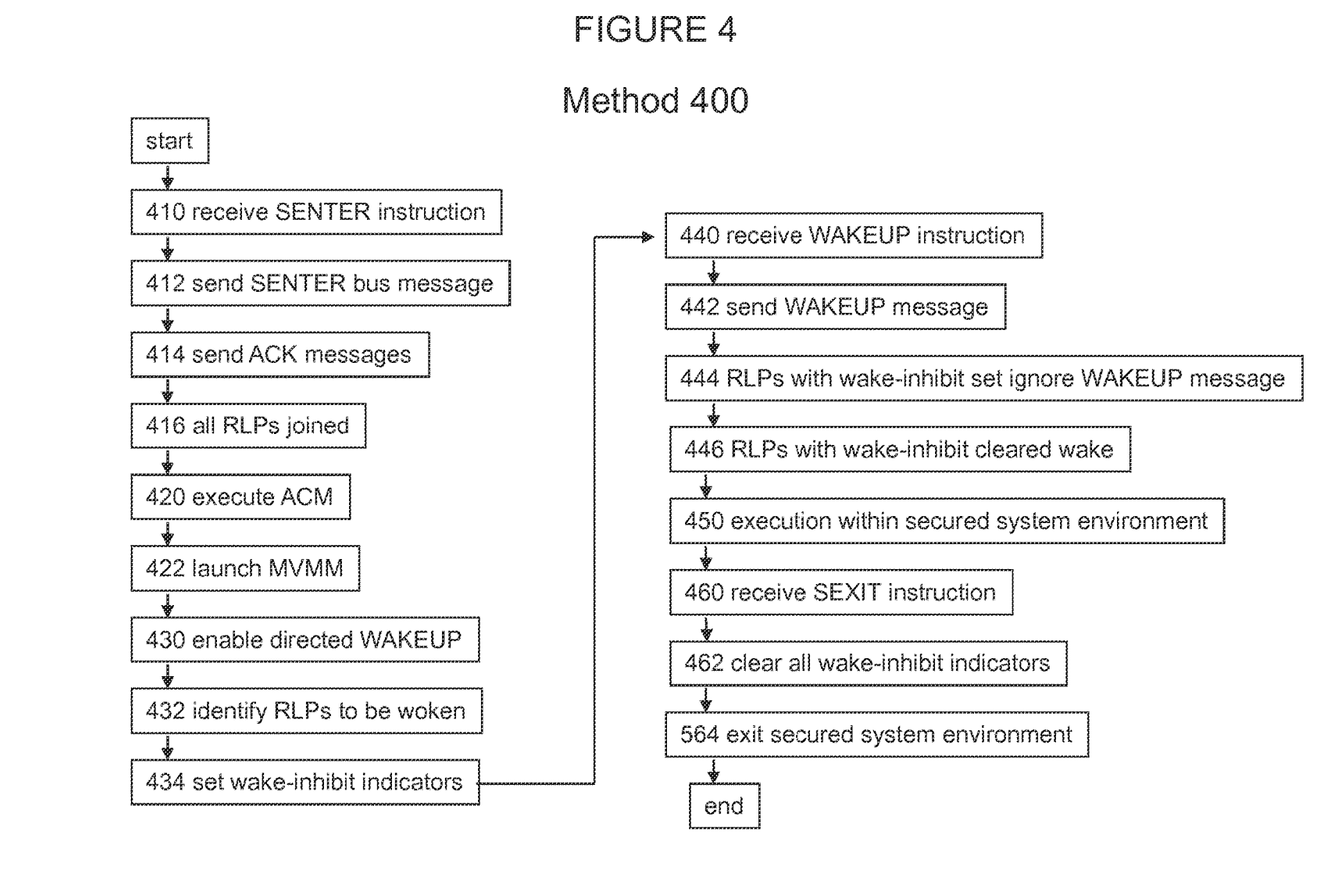
FIG. 4 illustrates a method for directed wakeup into a secured system environment according to an embodiment of the present invention.

FIG. 4 illustrates a method embodiment of the present invention, method 400 for directed wakeup into a secured system environment according to an embodiment of the present invention. For illustrative purposes, the description of method 400 may refer to elements of FIG. 1, 2, or 3, and/or instructions and bus messages of the Intel® Core® Processor Family, but method 200 and other method embodiments of the present invention are not intended to be limited by these references. Furthermore, method 400 may represent a compilation of separate methods, each potentially performed at different locations by a different entity or person or automatically.

For example, certain actions performed in method 400 may be performed by processor 200, in response to control signals generated by control unit 240, or by chipset 300, in response to control signals generated by control unit 320. Control signals in processor 200 may in turn be generated in response to instruction unit 230 decoding an instruction into one or more micro-instructions or micro-operations, and/or messaging unit 260 receiving a bus message or other transaction, and control signals in chipset 300 may in turn be generated in response to messaging unit 310 receiving a bus message or other transaction.

In box 410, the entry of system 100 into a secured system environment may be initiated, for example, by a BIOS, boot loader, an OS issuing a SENTER instruction to an ILP (e.g., processor 120). In box 412, processor 120 may send a SENTER bus message. In box 414, each RLP in system 100 (e.g., processors 130 and 140), may send ACK bus messages. In box 416, an indication that all RLPs have joined in the SENTER process may be set, for example, in ALL_JOINED storage location 350.

In box 420, the ILP may begin to execute its ACM. In box 422, the execution of the ACM may launch an MVMM.

In box 430, directed WAKE-UP may be enabled, for example, by executing an SMCTRL instruction with a value of '01h' in the EBX register. In box 432, the RLPs to be woken are identified, for example, based on the values in the ECX and/or EDX values, as described above. In box 434, an wake-inhibit indicator is set for each RLP to be kept in a sleep state.

In box 440, the ILP receives a WAKEUP instruction. In box 442, the ILP sends a WAKEUP bus message. In box 444, the RLPs for which the wake-inhibit indicator is set ignore the WAKEUP message and stay in the sleep state. In box 446, the RLPs for which the wake-inhibit indicator is not set wake up in response to the bus message.

In box 450, execution of application and other software in the secured system environment may proceed.

In box 460, the ILP receives an SEX instruction. In box 462, all of the wake-inhibit indicators are cleared. In box 464, the secured system environment is exited.

Within the scope of the present invention, the method illustrated in FIG. 5 may be performed in a different order, with illustrated boxes omitted, with additional boxes added, or with a combination of reordered, omitted, or additional boxes. For example, boxes 444 and 446 may occur during at the same time.

Thus, apparatuses, methods, and systems for directed wakeup into a secured system environment have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
    a control register;
    an instruction decoder to decode a control instruction and a secured system environment wakeup instruction, the secured system environment wakeup instruction to be decoded into wakeup control signals;
    a control unit to switch the processor into a directed wakeup mode in response to the control instruction being executed with a first value in the control register and to cause a wake-inhibit indicator to be set for each of a plurality of responding logical processor to be kept in a sleep state; and
    a messaging unit to, in response to the wakeup control signals, send a wakeup message to the plurality of responding logical processors, wherein, only when the processor is in the directed wakeup mode, the wakeup message is to be ignored by each of the plurality of responding logical processors for which the wake-inhibit indicator is set.

2. The processor of claim 1, wherein the control unit is also to determine which of the plurality of responding logical processors are to be kept in a sleep state.

3. The processor of claim 2, wherein the instruction decoder is also to decode the secured system environment wakeup instruction to provide information for determining which of the plurality of responding logical processors are to be kept in a sleep state.

4. The processor of claim 3, wherein the information is a mask.

5. The processor of claim 4, further comprising AND logic to perform a logical AND operation on the mask and an identification value for each responding logical processor to determine which of the plurality of logical processors are to be kept in the sleep state.

6. The processor of claim 1, wherein the instruction decoder is also to receive a secured system environment exit instruction, and the control unit is also to cause the wake-inhibit indicator to be cleared for each of the plurality of responding logical processor in response to the decode unit receiving the secured system environment exit instruction.

7. A method comprising:
  executing, by a processor, a control instruction to switch the processor into a directed wakeup mode;
  decoding into wakeup control signals, by an instruction decoder in the processor, a secured system environment wakeup instruction from software;
  causing a wake-inhibit indicator to be set for each of a plurality of responding logical processors to be kept in a sleep state; and
  sending, in response to the wakeup control signals, a wakeup message to the plurality of responding logical processors, wherein, only when the processor is in the directed wakeup mode, the wakeup message is to be ignored by each of the plurality of responding logical processors for which the wake-inhibit indicator is set.

8. The method of claim 7, further comprising determining which of the plurality of responding logical processors is to be kept in a sleep state.

9. The method of claim 8, wherein decoding the secured system environment wakeup instruction is also to provide information for determining which of the plurality of responding logical processors are to be kept in a sleep state.

10. The method of claim 9, wherein the information is a mask.

11. The method of claim 10, further comprising performing a logical AND operation on the mask and an identification value for each responding logical processor to determine which of the plurality of logical processors are to be kept in the sleep state.

12. The method of claim 7, further comprising decoding a secured system environment exit instruction.

13. The method of claim 12, further comprising causing the wake-inhibit indicator to be cleared for each of the plurality of responding logical processor in response to decoding the secured system environment exit instruction.

14. The method of claim 7, further comprising ignoring the wakeup message, by each of the plurality of responding logical processors for which the corresponding wake-inhibit indicator is set.

15. The method of claim 13, further comprising waking up in response to the wakeup message, by each of the responding logical processors for which the corresponding wake-inhibit indicator is cleared.

16. A system comprising:
  a plurality of responding logical processors;
  an initiating logical processor including
    a control register,
    an instruction decoder to decode a control instruction and a secured system environment wakeup instruction, the secured system environment wakeup instruction to be decoded into wakeup control signals,
    a control unit to switch the processor into a directed wakeup mode in response to the control instruction being executed with a first value in the control register and to determine which of the plurality of responding logical processors are to be kept in a sleep state, and
    a messaging unit, in response to the wakeup control signals, to send a wakeup message to the plurality of responding logical processors; and
  a plurality of wake-inhibit indicators, one for each of the plurality of responding logical processors;
  wherein each of the plurality of responding logical processors for which the corresponding wake-inhibit indicator is set is to ignore the wakeup message only when the initiating logical processor is in the directed wakeup mode.

17. The system of claim 16, wherein the instruction decoder is also to decode a secured system environment wakeup instruction to provide information for determining which of the plurality of responding logical processors are to be kept in a sleep state.

18. The system of claim 17, wherein the information is a mask.

19. The system of claim 18, further comprising AND logic to perform a logical AND operation on the mask and an identification value for each responding logical processor to determine which of the plurality of logical processors are to be kept in the sleep state.

20. The system of claim 16, wherein the instruction decoder is also to decode a secured system environment exit instruction, and the control unit is also to cause the wake-inhibit indicator to be cleared for each of the plurality of responding logical processor in response to the instruction decoder decoding the secured system environment exit instruction.

* * * * *